United States Patent
Yada et al.

(10) Patent No.: US 10,435,558 B2
(45) Date of Patent: Oct. 8, 2019

(54) BLOCK COPOLYMER AND RESIN COMPOSITION

(71) Applicant: NIPPON PAPER INDUSTRIES CO., LTD., Kita-ku (JP)

(72) Inventors: Minoru Yada, Yamaguchi (JP); Yuu Takata, Yamaguchi (JP); Junichi Hayakawa, Yamaguchi (JP); Shunji Sekiguchi, Yamaguchi (JP); Kazutaka Nakagawa, Tamaguchi (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 0 days.

(21) Appl. No.: 15/506,582

(22) PCT Filed: Aug. 26, 2015

(86) PCT No.: PCT/JP2015/074111
§ 371 (c)(1),
(2) Date: Feb. 24, 2017

(87) PCT Pub. No.: WO2016/031883
PCT Pub. Date: Mar. 3, 2016

(65) Prior Publication Data
US 2017/0275457 A1 Sep. 28, 2017

(30) Foreign Application Priority Data

Aug. 29, 2014 (JP) .................................. 2014-175207
Aug. 29, 2014 (JP) .................................. 2014-175208

(51) Int. Cl.
| C08F 2/38 | (2006.01) |
| C08L 75/04 | (2006.01) |
| C08F 293/00 | (2006.01) |
| C09D 153/00 | (2006.01) |
| C08L 53/00 | (2006.01) |
| C09D 11/106 | (2014.01) |
| C09D 11/107 | (2014.01) |
| C09D 175/04 | (2006.01) |

(52) U.S. Cl.
CPC ................ C08L 75/04 (2013.01); C08F 2/38 (2013.01); C08F 293/00 (2013.01); C08F 293/005 (2013.01); C08L 53/00 (2013.01); C09D 11/106 (2013.01); C09D 11/107 (2013.01); C09D 153/00 (2013.01); C09D 175/04 (2013.01); C08L 2666/24 (2013.01)

(58) Field of Classification Search
CPC .... C08F 210/00; C08F 210/02; C08F 210/04; C08F 210/06; C08F 210/10; C08F 216/02; C08F 216/04
See application file for complete search history.

(56) References Cited

U.S. PATENT DOCUMENTS

| 6,451,901 B1 | 9/2002 | Maekawa et al. |
| 7,226,979 B2 * | 6/2007 | Faust ........................ C08F 8/00 525/245 |
| 2002/0040098 A1 | 4/2002 | Maekawa et al. |

FOREIGN PATENT DOCUMENTS

| CN | 1262698 | 8/2000 |
| EP | 0 982 361 | 3/2000 |
| EP | 0 982 361 A1 | 3/2000 |
| JP | 5-86146 A | 4/1993 |
| JP | 10-139975 A | 5/1998 |
| JP | H11-172067 | * 6/1999 |
| JP | H11-335496 | 12/1999 |
| JP | 2000-063660 | 2/2000 |
| JP | 2001-98140 A | 4/2001 |
| JP | 2002-080686 | 3/2002 |
| JP | 2002-317137 A | 10/2002 |
| JP | 2008-291071 | * 12/2008 |
| JP | 2008-291071 A | 12/2008 |
| JP | 2013-203746 A | 10/2013 |
| WO | 2012/114776 A1 | 8/2012 |

OTHER PUBLICATIONS

Computer Translation of JP 2008-291071 (2008) (Year: 2008).*
Translation of JP H11-172067 (1999) (Year: 1999).*
International Search Report dated Dec. 1, 2015 in PCT/JP2015/074111 filed Aug. 26, 2015.
Extended European Search Report dated Mar. 5, 2018 in European Patent Application No. 15836679.9 citing document AO therein, 6 pages.
Office Action in Japanese Application No. 2016-545594, dated Jul. 3, 2019. (w/English Translation).
$2^{nd}$ Office Action in corresponding Chinese patent application No. 201580046201.8 dated May 17, 2019. (w/English Translation).

* cited by examiner

*Primary Examiner* — Robert C Boyle
(74) *Attorney, Agent, or Firm* — Oblon, McClelland, Maier & Neustadt, L.L.P.

(57) ABSTRACT

The present invention aims to provide a resin having an excellent solubility to alcohols, an excellent adherability to nonpolar base materials such as polyolefin, and not containing chlorine; and to provide a resin composition containing a urethane resin, not having the elimination problem of hydrochloric acid caused by external factors, having a good compatibility with a variety of components containing urethane resins, and having a good adherability to a variety of base materials, so that the resin composition can suitably be used as an ink, an adhesive, and paint. The present invention provides a block copolymer comprising a polymer block (A) mainly comprising olefin monomers and a polymer block (B) comprising vinyl monomers having hydroxy groups and other vinyl monomers copolymerizable with the vinyl monomers having hydroxy groups, in which a hydroxy value is within a range of 5 mg KOH/g to 120 mg KOH/g; a dispersion thereof; a resin composition containing the block copolymer and a urethane resin; and uses thereof.

23 Claims, No Drawings

BLOCK COPOLYMER AND RESIN COMPOSITION

TECHNICAL FIELD

The present invention relates to a block copolymer.

BACKGROUND ART

In recent years, solvents used for printing inks have been changing because of reinforcement of legislation, and an increasing interest in environmental protection and safety. In Japan, an outbreak of cholangiocarcinoma in 2012 has made people interested in safety of solvents used in printing work.

As solvents of printing inks for plastic films, aromatic solvents such as toluene and xylene have been conventionally used. However, from the viewpoint of safety, uses of toluene are encouraged to be avoided, and non-aromatic solvents such as ketone solvents and ester solvents started to be used instead. In recent years, from the viewpoint of toxic environments of printing work, uses of ketone solvents have been encouraged to be avoided also, and thus uses of ester solvents and alcohol solvents have been the current mainstreams. In particular, from the viewpoint of environmental protection and safety of work environments, an ink, in which an alcohol solvent such as ethanol, isopropanol, n-propanol, and methanol is used as a main component, has been desired.

Polyolefin base materials such as polypropylene have superior properties and are cheap on prices, and thus they have been widely used as a variety of films such as food wrapping materials; auto parts; and molded products. However, since the polyolefin base material is a nonpolar base material having the low surface free energy, it is one of low-adherent base materials. Thus when printing or coating is performed to a polyolefin base material, it has been generally known that adherence can be improved by adding chlorinated polyolefin into an ink and paint.

However, chlorinated polyolefin is hard to be dissolved in an alcohol solvent that has been increasingly used in the field of inks as mentioned above. In Patent Literature 1, it is described that a graft copolymer that is obtained by grafting an acryl monomer having an ethylenic unsaturated bond to chlorinated polyolefin having a given weight-average molecular weight and a given percentage of a chlorine content is used as a component of a resin composition for a printing ink not using an aromatic solvent such as toluene.

A urethane resin (polyurethane resin) has the following characteristics: tough, and a wide range of physical properties from soft to hard can be obtained; easy to control molecular weights and structures; easy to modify the molecules; excellent adherence to a variety of base materials; excellent chemical resistance and wear resistance; and excellent flexibility under low temperatures. Thus, the urethane resin is widely used as a binder for inks.

Although the urethane resin is somewhat adherent to both of polar base materials such as metals and nonpolar base materials such as polyolefin resins, stronger adhesiveness has been demanded. Meanwhile, a chlorinated polyolefin resin has excellent adhesiveness to polar base materials and nonpolar base materials, and is highly compatible with a variety of solvents and components. Accordingly, a chlorinated polyolefin resin is generally contained as an auxiliary binder in a urethane resin-based ink. However, chlorine contained in the chlorinated polyolefin is eliminated as hydrochloric acid by external factors such as heat and light, and this is the problem of the chlorinated polyolefin resin.

In Patent Literature 2, it is disclosed that a block copolymer including a polymer block (A) mainly comprising an olefin monomer unit; and a polymer block (B) including 2 to 100 mol % of vinyl monomer units having carboxy groups or anhydrous carboxylic acid groups and 98 to 0 mol % of other vinyl monomer units copolymerizable with the vinyl monomers may prevent the above-mentioned problem.

PRIOR ART LITERATURE

Patent Literature

Patent Literature 1: Japanese Patent Application Laid-open No. 2002-317137
Patent Literature 2: Japanese Patent Application Laid-open No. 2001-098140

SUMMARY OF INVENTION

Problem to be Solved by the Invention

In Patent Literature 1, however, an alicyclic solvent having a low polarity, such as methylcyclohexane, is required to be used with a graft copolymer, which means that the affinity of the graft copolymer to alcohols having higher polarities is still low. Currently, chlorinated polyolefin is the best agent to give adhesiveness to inks and paint having alcohols as their main components, and any other agents that exceed the chlorinated polyolefin have not been found. In addition, chlorinated polyolefin contains chlorine, and thus, for example, toxic substances such as dioxin may be generated when printed films containing the ink having the resin composition described in Patent Literature 1 are burned. Accordingly, an agent for giving adhesiveness to inks and paint, which is highly soluble in alcohols, and not using chlorine, has been needed to be developed.

The block copolymer described in Patent Literature 2 has some problems, such as an insufficient compatibility with a variety of solvents and components, and an insufficient adherability to a variety of materials.

The present invention aims to provide a resin having an excellent solubility to alcohols, an excellent adherability to nonpolar base materials such as polyolefin, and an excellent solvent property without containing chlorine.

The present invention also aims to obtain a resin composition not having the elimination problem of hydrochloric acid caused by external factors, having a good compatibility with a variety of components containing urethane resins, and having a good adherability to a variety of base materials, so that the resin composition can suitably be used as an ink, an adhesive, and paint.

Means for Solving Problem

The present invention provides the following [1] to [10].
[1] A block copolymer comprising a polymer block (A) mainly comprising olefin monomers and a polymer block (B) comprising vinyl monomers having hydroxy groups and other vinyl monomers copolymerizable with the vinyl monomers having hydroxy groups,
wherein the block copolymer has a hydroxy value within a range of 5 mg KOH/g to 120 mg KOH/g.
[2] The block copolymer according to [1], wherein an amount of the polymer block (A) contained in the block copolymer is within a range of 10% by weight to 90% by weight.

[3] The block copolymer according to [1] or [2], wherein a glass transition temperature of the polymer block (B) is 10° C. or above.
[4] The block copolymer according to any one of [1] to [3], wherein the block copolymer has a weight-average molecular weight within a range of 1,000 to 100,000.
[5] A block copolymer dispersion comprising the block copolymer according to any one of [1] to [4] dispersed in a solvent containing 50% by weight or more of an alcohol.
[6] A resin composition comprising the block copolymer (C) according to any one of [1] to [4] and a urethane resin (D).
[7] A composition for inks, paint, or adhesives, the composition comprising the block copolymer according to any one of [1] to [4]; the dispersion according to [5]; or the resin composition according to [6].
[8] The composition according to [7], wherein the composition is for inks of gravure printing or flexo printing.
[9] A printed material obtained by a method for gravure printing or flexo printing using the composition according to [8].
[10] A method for gravure printing or flexo printing using the composition according to [8].

The present invention provides the following [1] to [10].
The present invention also provides the following [11] to [19].

[11] A block copolymer comprising a polymer block (A) mainly comprising olefin monomers and a polymer block (B) comprising vinyl monomers having hydroxy groups and other vinyl monomers copolymerizable with the vinyl monomers having hydroxy groups,
wherein the block copolymer has a hydroxy value within a range of 5 mg KOH/g to 120 mg KOH/g.
[12] The block copolymer according to [11], wherein an amount of the polymer block (A) contained in the block copolymer is within a range of 10% by weight to 90% by weight.
[13] The block copolymer according to [11] or [12], wherein a glass transition temperature of the polymer block (B) is 10° C. or above.
[14] The block copolymer according to any one of [11] to [13], wherein the block copolymer has a weight-average molecular weight within a range of 1,000 to 100,000.
[15] A block copolymer dispersion comprising the block copolymer according to any one of [11] to [14] dispersed in a solvent containing 50% by weight or more of an alcohol.
[16] A composition for inks, paint, or adhesives, the composition comprising the block copolymer according to any one of [11] to [14]; or the dispersion according to [15].
[17] The composition according to [16], wherein the composition is for inks of gravure printing or flexo printing.
[18] A printed material obtained by a method for gravure printing or flexo printing using the composition according to [17].
[19] A method for gravure printing or flexo printing using the composition according to [17].

The present invention further provides the following [21] to [28].

[21] A resin composition comprising a block copolymer (C) comprising the following polymer blocks (A) and (B), and having a hydroxy value within a range of 5 mg KOH/g to 120 mg KOH/g, and a urethane resin (D),
a polymer block (A): a polymer block mainly comprising olefin monomers; and
a polymer block (B): a polymer block comprising vinyl monomers having hydroxy groups and other vinyl monomers copolymerizable with the vinyl monomers having hydroxy groups.

[22] The resin composition according to [21], wherein an amount of the polymer block (A) contained in the block copolymer (C) is within a range of 10% by weight to 90% by weight.
[23] The resin composition according to [21] or [22], wherein a glass transition temperature of the polymer block (B) is 10° C. or above.
[24] The resin composition according to any one of [21] to [23], wherein the block copolymer (C) has a weight-average molecular weight within a range of 1,000 to 100,000.
[25] A resin composition according to any one of [21] to [24], wherein the composition is for inks, paint, or adhesives.
[26] The composition according to [25], wherein the composition is for inks of gravure printing.
[27] A printed material obtained by a method for gravure printing using the composition according to [26].
[28] A method for gravure printing using the composition according to [26].

Effect of the Invention

According to the present invention, a resin that has an excellent solubility to alcohols and an excellent adherability to nonpolar base materials such as polyolefin, and that is safe because of not containing chlorine, is provided.
According to the present invention, a resin composition containing a urethane resin, which can suppress the elimination problem of hydrochloric acid caused by external factors; which has a good adherability to a variety of base materials; in which the urethane resin (D) and the block copolymer (C) are sufficiently compatible with each other; and which can suitably be used as an ink, an adhesive, and paint; is provided.

EMBODIMENT FOR CARRYING OUT THE INVENTION

The block copolymer (C) according to the present invention includes the polymer block (A) and the polymer block (B) as described below. That is, the block copolymer (C) comprises the polymer blocks (A) and (B), and usually consists of the polymer blocks (A) and (B). Examples of the block copolymer (C) include an AB-type diblock copolymer, an ABA-type triblock copolymer, and a BAB-type triblock copolymer. Among them, an AB-type diblock copolymer is preferable.
The polymer block (A) is a polymer block mainly comprising an olefin monomer unit. That is, the polymer block (A) is a polymer block including a polymer mainly comprising an olefin monomer unit. An amount of the olefin monomer unit contained in the polymer block (A) is determined based on the total number of moles of the all structural units of the polymer block (A), and is preferably 50 mol % or more, more preferably 70 mol % or more, and still more preferably 80 mol % or more. Although there is not a particular upper limit, the amount may be 100 mol % or less.
The olefin monomer unit means a unit derived from olefin monomers. Examples of the olefin monomer unit include units derived from olefin monomers of ethylene; α-olefins such as propylene, 1-butene, 2-methyl-1-butene, 3-methyl-1-butene, 1-pentene, 4-methyl-1-pentene, 1-hexene, 1-octene, 1-decene, and 1-octadecene; 2-butene; conjugated dienes such as isobutylene, butadiene, isoprene, and cyclopentadiene; vinyl cyclohexane; and β-pinene. The polymer block (A) can contain one or two or more of these olefin monomer units. The polymer block (A) preferably contains a unit derived from ethylene, propylene, or 1-butene. Among them, the polymer block (A) more preferably contains a polymer block including units derived from propylene; and a copolymer block including a unit derived from propylene and a unit derived from an α-olefin other than propylene (preferably ethylene and/or 1-butene). In the case where the olefin monomer unit is a unit derived from conjugated dienes such as butadiene, isoprene, and cyclopentadiene, an unsaturated bond remained in the unit may be hydrogenated. In the case of a copolymer block including a unit derived from propylene and a unit derived from an α-olefin other than propylene (preferably ethylene and/or 1-butene), a ratio by weight for the propylene components is preferably a unit derived from propylene: a unit derived from another α-olefin=50 to 100:50 to 0, and more preferably 70 to 100:30 to 0.

A polymer included in the polymer block (A) may contain one or two or more unit(s) other than the olefin monomer unit. Examples of the unit other than the olefin monomer unit include a unit derived from vinyl monomers that are copolymerizable with olefin monomers. The amount of the unit other than the olefin monomer unit (preferably a unit derived from vinyl monomers that are copolymerizable with olefin monomers) is usually 50 mol % or less, preferably 30 mol % or less, and more preferably 20 mol % or less. Although there is not a particular lower limit, the amount may be 0 mol % or more.

The vinyl monomer that is copolymerizable with an olefin monomer may be a vinyl monomer that is copolymerizable with the above-described olefin monomer. Examples thereof include (meth)acrylonitrile; vinyl esters, such as vinyl acetate and vinyl pivalate; (meth)acrylic acid esters such as methyl (meth)acrylate, ethyl (meth)acrylate, butyl (meth)acrylate, dodecyl (meth)acrylate, and 2-ethylhexyl (meth) acrylate; (meth)acrylamide; and N-vinyl-2-pyrrolidone; and one or two or more of them can be used. Among them, methyl acrylate, ethyl acrylate, and vinyl acetate are preferable.

The polymer mainly comprising an olefin monomer unit, which is included in the polymer block (A), may be denatured. The denaturation is not particularly limited, and denaturation such as epoxidation; hydroxylation; anhydrous carboxylate modification; or carboxylate modification can be performed to the polymer by using a known method.

The polymer mainly comprising an olefin monomer unit, which is included in the polymer block (A), may be thermally degraded. Accordingly, the molecular weight of the polymer block (A) can be adjusted by introducing double bonds to the ends of the polymer mainly comprising an olefin monomer unit, which is included in the polymer block (A). The method for thermal degradation is not particularly limited, and examples thereof include a method for thermally decomposing a polymer mainly comprising an olefin monomer unit in an oxygen-free atmosphere at 400 to 500° C.; and a method for decomposing a polymer mainly comprising an olefin monomer unit in an oxygen-free atmosphere under the presence of a small amount of an organic peroxide. Examples of the organic peroxide include di-t-butyl peroxide, dicumyl peroxide, t-butyl cumyl peroxide, benzoyl peroxide, dilauryl peroxide, cumene hydroperoxide, t-butyl hydroperoxide, 1,1-bis(t-butylperoxy)-3,5,5-trimethyl cyclohexane, 1,1-bis(t-butylperoxy)-cyclohexane, cyclohexanone peroxide, t-butylperoxybenzoate, t-butylperoxy isobutyrate, t-butylperoxy-3,5,5-trimethyl hexanoate, t-butylperoxy-2-ethyl hexanoate, t-butylperoxy isopropyl carbonate, and cumyl peroxy octoate.

The polymer block (B) is a polymer block including vinyl monomers having hydroxy groups and other vinyl monomers copolymerizable with the vinyl monomers.

An amount of the vinyl monomer unit having a hydroxy group contained in the polymer block (B) is determined based on the total number of moles of the all structural units of the polymer block (B), and is preferably 70 mol % or less, more preferably 50 mol % or less, and still more preferably 40 mol % or less. The lower limit is preferably 2 mol % or more, and more preferably 10 mol % or more. The amount of the vinyl monomer unit having a hydroxy group is preferably within a range of 2 mol % to 70 mol %, more preferably within a range of 5 mol % to 50 mol %, and still more preferably within a range of 10 mol % to 40 mol %.

Examples of the vinyl monomer having a hydroxy group include 2-hydroxyethyl (meth)acrylate, 1-hydroxypropyl (meth)acrylate, 2-hydroxypropyl (meth)acrylate, 4-hydroxybutyl (meth)acrylate, polyethylene glycol mono(meth)acrylate, polypropylene glycol mono(meth)acrylate, polytetramethylene glycol mono(meth)acrylate, and hydroxy styrene. One or two or more of them can be used. Among them, 2-hydroxyethyl (meth)acrylate and 4-hydroxybutyl (meth)acrylate are preferable.

The polymer block (B) contains other vinyl monomer units copolymerizable with the vinyl monomers having hydroxy groups with an amount determined based on the total number of moles of the all structural units of the polymer block (B), and the amount is preferably 30 mol % or more, more preferably 50 mol % or more, and still more preferably 60 mol % or more. The upper limit is preferably 98 mol % or less, and more preferably 90 mol % or less. The polymer block (B) contains other vinyl monomer units preferably by 30 to 98 mol %, more preferably by 50 to 95 mol %, and still more preferably by 60 to 90 mol %. The other vinyl monomers mean vinyl monomers other than the vinyl monomers having hydroxy groups, that is, vinyl monomers not having hydroxy groups. Examples thereof include styrene monomers such as styrene; (meth)acrylonitrile; vinyl esters, such as vinyl acetate and vinyl pivalate, (meth)acrylic acid, (meth)acrylic acid esters, such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, dodecyl (meth)acrylate, 2-ethylhexyl (meth)acrylate, stearyl (meth)acrylate, isobornyl (meth)acrylate, tetrahydrofurfuryl (meth)acrylate, cyclohexyl (meth)acrylate, benzyl (meth)acrylate, phenoxyethyl (meth)acrylate, 2-ethoxyethyl (meth)acrylate, 2-methoxyethyl (meth)acrylate, and adamantyl (meth)acrylate, (meth)acrylamide, and N-vinyl pyrrolidone, and one or two or more of them can be used. Among them, methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, dodecyl (meth)acrylate, 2-ethylhexyl (meth)acrylate, stearyl (meth)acrylate, isobornyl (meth)acrylate, tetrahydrofurfuryl (meth)acrylate, cyclohexyl (meth)acrylate, benzyl (meth)acrylate, phenoxyethyl (meth)acrylate, 2-ethoxyethyl (meth)acrylate, 2-methoxyethyl (meth)acrylate, adamantyl (meth)acrylate, (meth)acrylamide, and N-vinyl pyrrolidone are preferable, and methyl (meth)acrylate, ethyl (meth)acrylate, n-butyl (meth)acrylate, tert-butyl (meth)acrylate, stearyl (meth)acrylate, isobornyl (meth)acrylate, cyclohexyl (meth)acrylate, and adamantyl (meth)acrylate are more preferable. When two or more of them are used, any of the combination of methyl (meth)acrylate and cyclohexyl (meth)acrylate, the combination of ethyl (meth)acrylate and isobornyl (meth)

acrylate, and the combination of ethyl (meth)acrylate and tert-butyl (meth)acrylate is preferably contained.

Examples of preferred combinations of polymer units contained in the polymer block (B) include combinations of 2-hydroxyethyl (meth)acrylate and/or 4-hydroxybutyl (meth)acrylate, as vinyl monomers having hydroxy groups; and one or more selected from the group consisting of methyl (meth)acrylate, ethyl (meth)acrylate, n-butyl (meth)acrylate, tert-butyl (meth)acrylate, dodecyl (meth)acrylate, 2-ethylhexyl (meth)acrylate, stearyl (meth)acrylate, isobornyl (meth)acrylate, tetrahydrofurfuryl (meth)acrylate, adamantyl (meth)acrylate, and cyclohexyl (meth)acrylate, as other vinyl monomers copolymerizable with the vinyl monomers having hydroxy groups. Other vinyl monomers copolymerizable with the vinyl monomers having hydroxy groups preferably contain any of the combination of methyl (meth)acrylate and cyclohexyl (meth)acrylate, the combination of ethyl (meth)acrylate and isobornyl (meth)acrylate, and the combination of ethyl (meth)acrylate and tert-butyl (meth)acrylate.

The component ratio of each of the monomers in the polymer block (B) (vinyl monomers having hydroxy groups: other copolymerizable vinyl monomers [if two or more are used, the sum of them]) is usually 2:100 to 50:100, preferably 5:100 to 40:100, and more preferably 10:100 to 30:100.

Note that, in the present invention, (meth)acrylate refers to acrylate and methacrylate. Also in the present invention, hydroxy groups in carboxyl groups are not included in hydroxy groups in the polymer block (B).

The glass transition temperature of the polymer block (B) is preferably 10° C. or above. Accordingly, the block copolymer (C) or a resin composition containing thereof can exhibit sufficient coating strength when used as an ink, paint or the like, and can also exhibit sufficient adherability to base materials. Also, blocking during printing can be suppressed when used as an ink.

Although the upper limit of the glass transition temperature of the polymer block (B) is not particularly limited, it is preferably 200° C. or below, more preferably 100° C. or below, still more preferably 60° C. or below, and further more preferably 50° C. or below. Accordingly, when the block copolymer (C) or a resin composition is used as an ink, paint or the like, coating can be prevented from being too hard, in other words, coating can exhibit proper flexibility.

The glass transition temperature (Tg (° C.)) can be calculated by using the FOX equation. That is, the glass transition temperature (Tg) and the weight fraction (W) of the homopolymer of each of the vinyl monomers included in the polymer block (B) are calculated, and then a proportion of Tg to W for each of the homopolymers is summed up. As Tg of each of the homopolymers, Tg described in Polymer Handbook (Wiley-Interscience Publication, 4th Edition, 1999) and product data may be used.

$$1/Tg = W_1/Tg_1 + W_2/Tg_2 + W_3/Tg_3 + \ldots + W_n/Tg_n \quad \text{<FOX Equation>}$$

The above-mentioned equation is used when the polymer block (B) comprises n number of monomers. $Tg_1$ is the glass transition temperature of the homopolymer of the monomer 1 included in the polymer block (B), and $W_1$ is the weight fraction of the homopolymer of the monomer 1. $Tg_2$ is the glass transition temperature of the homopolymer of the monomer 2 included in the polymer block (B), and $W_2$ is the weight fraction of the homopolymer of the monomer 2. $Tg_3$ is the glass transition temperature of the homopolymer of the monomer 3 included in the polymer block (B), and $W_3$ is the weight fraction of the homopolymer of the monomer 3. $Tg_n$ is the glass transition temperature of the homopolymer of the monomer n included in the polymer block (B), and $W_n$ is the weight fraction of the homopolymer of the monomer n.

The weight-average molecular weight of the polymer block (A) is preferably 500 or more, but less than 100,000, and more preferably 1,000 or more, but less than 50,000. The weight-average molecular weight of the polymer block (B) is preferably 500 or more, but less than 100,000, and more preferably 1,000 or more, but less than 50,000.

The weight-average molecular weight of the block copolymer (C) is preferably 100,000 or less, and more preferably 50,000 or less. Accordingly, when the block copolymer (C) is mixed with other components included in inks, paint or the like, worsening of compatibilities or increase of solution viscosities can be suppressed, so that good inks and paint can be prepared. In addition, the solubility of the block copolymer (C) can be kept in a good state, so that the solution property can be kept stable to keep a good application property. The weight-average molecular weight of the block copolymer (C) is preferably 1,000 or more, and more preferably 2,000 or more. Accordingly, insufficient cohesion will be avoided, so that good adherability to base materials such as polyolefin base materials can be exhibited. The weight-average molecular weight of the block copolymer (C) is preferably within a range of 1,000 to 100,000, and more preferably within a range of 2,000 to 50,000.

The weight-average molecular weight can be obtained from a standard polystyrene curve by using the gel permeation chromatography (GPC) method.

An amount of the polymer block (A) contained in the block copolymer (C) is preferably 10% by weight or more, more preferably 20% by weight or more, and further preferably 30% by weight or more. The upper limit is preferably 90% by weight or less, more preferably 80% by weight or less, and further preferably 70% by weight or less. An amount of the polymer block (B) contained in the block copolymer (C) is preferably 90% by weight or less, more preferably 80% by weight or less, and further preferably 70% by weight or less. The lower limit is preferably 10% by weight or more, more preferably 20% by weight or more, and further preferably 30% by weight or more.

Note that, in the present invention, the amount of a polymer block and the amount of a monomer unit may be specified with a charged amount of each of the raw materials (polymers or monomers) and a polymerization degree of the monomer unit.

The melting point (Tm) of the polymer block (A) is preferably 40° C. or above, and more preferably 50° C. or above. The upper limit is preferably 120° C. or below, and more preferably 90° C. or below. The Tm of the polymer block (A) is preferably within a range of 40° C. to 120° C., and more preferably within a range of 50° C. to 90° C.

Although a method for manufacturing the block copolymer (C) is not particularly limited, examples thereof include a method of radical polymerization of monomer components included in the polymer block (B) under the presence of the polymer block (A) having mercapto groups on its ends. According to this method, the block copolymer (C) having a desired weight-average molecular weight and a molecular weight distribution can easily and efficiently be manufactured.

Although a method for manufacturing the polymer block (A) having mercapto groups on its ends is not particularly limited, examples thereof include a method including introducing double bonds to ends of a polymer mainly comprising an olefin monomer unit, adding an acid such as thioacetic acid, thiobenzoic acid, thiopropionic acid, thiobutyric acid, and thiovaleric acid via the double bonds, and treating the polymer with an acid or an alkali; and a method in which ethylene sulfide is used as a terminator when a polymer mainly comprising an olefin monomer unit is manufactured by an anionic polymerization method.

Although a method for radical polymerization of monomer components included in the polymer block (B) under the presence of the polymer block (A) having mercapto groups on its ends is not particularly limited, examples thereof include a solution method including dissolving the polymer block (A) having mercapto groups on its ends in an organic solvent such as toluene; adding monomer components included in the polymer block (B) thereto; and adding a radical generator thereto under stirring. When the radical polymerization is performed, a radical generator may be used. Although the radical generator is not particularly limited, an azo initiator is preferable. Examples of the azo initiator include 2,2'-azobis(4-methoxy-2,4-dimethylvaleronitrile), 2,2'-azobis(2,4-dimethylvaleronitrile), dimethyl-2,2'-azobis(2-methyl propionate), 2,2'-azobis(2-methylbutyronitrile), 1,1'-azobis(cyclohexane-1-carbonitrile), 2,2'-azobis(N-butyl-2-methylpropionamide), and 2,2'-azobis(N-cyclohexyl-2-methylpropionamide); and the one having an appropriate half-life temperature may be selected depending on a temperature at which the radical polymerization is performed.

Although a method for obtaining the block copolymer (C) from the reaction liquid polymerized in the solution method is not particularly limited, examples thereof include a method in which a solvent, unreacted monomers and the like in a reaction liquid is removed by performing a vacuum distillation in a reaction vessel; a method in which a solvent, unreacted monomers and the like are removed by vacuuming a reaction liquid as thinning it in a device such as a film evaporator and an extruder; and a method in which a solvent, unreacted monomers and the like are removed by dropping a reaction liquid into a poor solvent such as methanol.

In the present invention, the hydroxy value of the block copolymer (C) is preferably 5 mg KOH/g or higher, and more preferably 10 mg KOH/g or higher. Accordingly, lowering of polarities can be prevented, and solubilities to alcohols and adherabilities to polyolefin base materials will be sufficiently exhibited. Meanwhile, the upper limit is preferably 120 mg KOH/g or less, and more preferably 80 mg KOH/g or less. Accordingly, extreme increase of polarities can be prevented, and compatibilities with other components existing in inks or paint can be lowered, so that lowering of adherabilities to polyolefin base materials can be suppressed. The hydroxy value of the block copolymer (C) is preferably within a range of 5 mg KOH/g to 120 mg KOH/g, and more preferably within a range of 10 mg KOH/g to 80 mg KOH/g.

The hydroxy value can be calculated according to weight proportions of vinyl monomers and a polymerization degree.

The block copolymer (C) of the present invention and a solvent may constitute a composition together. The solvent preferably contains an alcohol, and more preferably contains an alcohol having the carbon atom number of 1 to 3. Since the block copolymer (C) has an excellent dispersibility (solubility and/or compatibility) to solvents containing alcohols, a block copolymer dispersion can be formed by dispersing the block copolymer in a solvent containing an alcohol. The ratio of the block copolymer (C) and the solvent in the above-mentioned composition, or in the dispersion, is preferably 70 to 5:30 to 95, and more preferably 50 to 15:50 to 85. The concentration of the block copolymer (C) in the dispersion is preferably 10% by weight or more, preferably 15% by weight or more, more preferably 20% by weight or more, still more preferably 25% by weight or more, and further preferably 30% by weight or more.

Examples of the alcohol include aliphatic alcohols such as methanol, ethanol, n-propyl alcohol, isopropyl alcohol, n-butyl alcohol, isobutyl alcohol, sec-butyl alcohol, tert-butyl alcohol, and 2-ethyl-hexanol, as well as glycol monoethers such as propylene glycol monomethyl ether, propylene glycol monoethyl ether, propylene glycol monopropyl ether, propylene glycol monoisopropyl ether, and propylene glycol monobutyl ether.

Examples of the alcohol having the carbon atom number of 1 to 3 include methanol, ethanol, n-propyl alcohol, and isopropyl alcohol.

An amount of the alcohol is usually 30% by weight or more, preferably 40% by weight or more, and more preferably 50% by weight or more, to the total amount of the solvent. There is not a particular upper limit, and the amount may be 100% by weight or less.

In the present invention, other solvents can be used in combination. Other solvents herein may be solvents usually used for inks and/or paint, and examples thereof include aromatic solvents such as toluene and xylene; alicyclic hydrocarbon solvents such as cyclohexane and methyl cyclohexane; hydrocarbon solvents such as hexane, heptane, and octane; ketone, solvents such as acetone, methyl ethyl ketone, and methyl isobutyl ketone; ester solvents such as methyl acetate, ethyl acetate, n-propyl acetate, isopropyl acetate, and n-butyl acetate; glycol solvents such as ethylene glycol, ethyl cellosolve, and butyl cellosolve; and water. Among them, ester solvents and water are preferable, and ethyl acetate, propyl acetate, and water are more preferable. An amount of other solvents is preferably less than 50% by weight to the total amount of the solvent. There is not a particular lower limit, and the amount may be 0% by weight.

The block copolymer (C) of the present invention may form a resin composition together with the urethane resin (D).

In the present invention, the urethane resin (D) may be a polymer having urethane bonds, such as a resin produced by condensing a compound having an isocyanate group and a compound having a hydroxy group. The urethane resin (D) is classified into types such as a yellow type, a non-yellowing type, an ether type, and an ester type. Any urethane resins can be used if they are usually used for inks, adhesives, and paint.

The resin composition of the present invention may contain the solvent (E). Examples of the solvent (E) include the solvents exemplified as alcohols and other solvents, and mixed solvents of two or more selected from these solvents. Among them, the solvent (E) is preferably a mixed solvent of two or more selected from alicyclic hydrocarbon solvents, ketone solvents, ester solvents, and alcohol solvents.

An amount of the block copolymer (C) contained in the resin composition of the present invention is preferably within a range of 1% by weight to 30% by weight, and more preferably within a range of 2% by weight to 20% by weight. An amount of the urethane resin (D) contained in the resin composition of the present invention is preferably within a range of 99% by weight to 70% by weight, and more preferably within a range of 80% by weight to 98% by weight. When the resin composition of the present invention contains the solvent (E), an amount of the solvent (E) is preferably within a range of 20% by weight to 95% by weight, and more preferably within a range of 30% by weight to 80% by weight.

A method for manufacturing the resin composition of the present invention is not particularly limited, and the resin composition can be prepared by mixing each of the components. Examples of the method for manufacturing the resin composition of the present invention, in the case where the solvent (E) is contained, include a method including dissolving the block copolymer (C) and the urethane resin (D) in individual solvents; and mixing each of the solutions to prepare the composition.

The block copolymer, the dispersion thereof, and the resin composition of the present invention are useful as components of a composition used for inks, paint, and adhesives, preferably as components of an ink composition used for gravure printing or flexo printing. If desired, the composition used for inks, paint, or adhesives contains components usually contained in inks, paint, or adhesives, in addition to the block copolymer or the dispersion thereof.

The ink composition used for gravure printing or flexo printing of the present invention can be printed on a variety of materials for printing by a variety of printing methods. Examples of the materials for printing include resin films, such as polyolefin films, polyester films, and nylon films; and paper. Gravure printing or flexo printing can be performed according to conventional methods.

EXAMPLES

Hereinafter, the present invention will be explained in detail with reference to examples, but the present invention is not limited to these examples.

<Manufacture of Polymer Block (A1): Manufacture of α-Olefin Polymer Having Mercapto Group on its End>

(1) An α-olefin polymer (a propylene copolymer containing a 92 mol % propylene component and an 8 mol % ethylene component) was manufactured by using a metallocene catalyst (the weight-average molecular weight was 60,000, Tm=70° C.). The α-olefin polymer was fed to a twin screw extruder, and was melt-kneaded at 420° C. to be thermally decomposed, so that an α-olefin polymer having double bonds on its ends (the weight-average molecular weight was 20,000) was manufactured.

(2) In a reactor, 100 parts by weight of the α-olefin polymer having double bonds on its ends obtained in (1), 300 parts by weight of xylene, and 10 parts by weight of thioacetic acid were placed, and the inside of the reactor was purged with nitrogen sufficiently. To the reactor, 0.2 part by weight of 2,2'-azobisisobutyronitrile was added, and the mixture was reacted at 90° C. for 2 hours. The reactant was allowed to be precipitated in methanol, and unreacted thioacetic acid was removed to manufacture an α-olefin polymer having thioacetyl groups on its ends.

(3) In a mixed solvent of 200 parts by weight of xylene and 20 parts by weight of n-butanol, 100 parts by weight of the α-olefin polymer having thioacetyl groups on its ends obtained in (2) was dissolved. To the solution, 20 parts by weight of a 4% n-butanol solution of potassium hydroxide was added, and the mixture was reacted in nitrogen gas at 110° C. for 1 hour. After that, 1.2 parts by weight of acetic acid was added thereto to manufacture an α-olefin polymer having mercapto groups on its ends (polymer block (A1)).

<Manufacture of Polymer Block (A2): Manufacture of α-Olefin Polymer Having Mercapto Group on its End>

(1) An α-olefin polymer (a propylene copolymer containing an 80 mol % propylene component and a 20 mol % 1-butene component) was manufactured by using a metallocene catalyst (the weight-average molecular weight was 300,000, Tm=85° C.). The α-olefin polymer was fed to a twin screw extruder, and was melt-kneaded at 420° C. to be thermally decomposed, so that an α-olefin polymer having double bonds on its ends (the weight-average molecular weight was 60,000) was manufactured.

(2) In a reactor, 100 parts by weight of the α-olefin polymer having double bonds on its ends obtained in (1), 300 parts by weight of xylene, and 10 parts by weight of thioacetic acid were placed, and the inside of the reactor was purged with nitrogen sufficiently. To the reactor, 0.2 part by weight of 2,2'-azobisisobutyronitrile was added, and the mixture was reacted at 90° C. for 2 hours. The reactant was allowed to be precipitated in methanol, and unreacted thioacetic acid was removed to manufacture an α-olefin polymer having thioacetyl groups on its ends.

(3) In a mixed solvent of 200 parts by weight of xylene and 20 parts by weight of n-butanol, 100 parts by weight of the α-olefin polymer having thioacetyl groups on its ends obtained in (2) was dissolved. To the solution, 20 parts by weight of a 4% n-butanol solution of potassium hydroxide was added, and the mixture was reacted in nitrogen gas at 110° C. for 1 hour. After that, 1.2 parts by weight of acetic acid was added thereto to manufacture an α-olefin polymer having mercapto groups on its ends (polymer block (A2)).

<Manufacture of Polymer Block (A3): Manufacture of α-olefin Polymer Having Mercapto Group on Its End>

(1) An α-olefin polymer (a propylene copolymer containing a 90 mol % propylene component and a 10 mol % ethylene component) was manufactured by using a metallocene catalyst (the weight-average molecular weight was 200,000, Tm=65° C.). The α-olefin polymer was placed in a 1 L reactor, the inside temperature was raised until it became 390° C., and the α-olefin polymer was stirred for 2 hours under vacuum, so that an α-olefin polymer having double bonds on its ends (the weight-average molecular weight was 1,300) was manufactured.

(2) In a reactor, 100 parts by weight of the α-olefin polymer having double bonds on its ends obtained in (1), 300 parts by weight of xylene, and 10 parts by weight of thioacetic acid were placed, and the inside of the reactor was purged with nitrogen sufficiently. To the reactor, 0.2 part by weight of 2,2'-azobisisobutyronitrile was added, and the mixture was reacted at 90° C. for 2 hours. The reactant was allowed to be precipitated in methanol, and unreacted thioacetic acid was removed to manufacture an α-olefin polymer having thioacetyl groups on its ends.

(3) In a mixed solvent of 200 parts by weight of xylene and 20 parts by weight of n-butanol, 100 parts by weight of the α-olefin polymer having thioacetyl groups on its ends obtained in (2) was dissolved. To the solution, 20 parts by weight of a 4% n-butanol solution of potassium hydroxide was added, and the mixture was reacted in nitrogen gas at 110° C. for 1 hour. After that, 1.2 parts by weight of acetic acid was added thereto to manufacture an α-olefin polymer having mercapto groups on its ends (polymer block (A3)).

Example 1

In 250 parts by weight of toluene, 100 parts by weight of the polymer block (A1) was dissolved. To the solution, 20 parts by weight of methyl acrylate, 80 parts by weight of cyclohexyl acrylate, and 10 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent and unreacted monomers were removed to obtain the AB-type diblock copolymer including the α-olefin polymer block (A) and the acrylic acid ester block (B) (hereinafter, referred to as "block copolymer (1)"). The weight-average molecular weight of the obtained block copolymer (1) was 30,000.

To 100 parts by weight of the manufactured block copolymer (1), 210 parts by weight of isopropyl alcohol was added, and the mixture was warmed to be dissolved under stirring. To the solution, 23 parts by weight of water was added, and the solution was cooled under stirring to obtain the alcoholic resin dispersion (1).

Example 2

In 250 parts by weight of toluene, 100 parts by weight of the polymer block (A1) was dissolved. To the solution, 40 parts by weight of ethyl acrylate, 60 parts by weight of isobornyl acrylate, and 30 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (2)"). The weight-average molecular weight of the obtained block copolymer (2) was 32,000.

To 100 parts by weight of the manufactured block copolymer (2), 117 parts by weight of isopropyl alcohol was added, and the mixture was warmed to be dissolved under stirring. To the solution, 117 parts by weight of methanol was added, and the solution was cooled under stirring to obtain the alcoholic resin dispersion (2).

Example 3

In 250 parts by weight of toluene, 100 parts by weight of the polymer block (A1) was dissolved. To the solution, 20 parts by weight of ethyl acrylate, 80 parts by weight of tert-butyl acrylate, and 20 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (3)"). The weight-average molecular weight of the obtained block copolymer (3) was 30,000.

To 100 parts by weight of the manufactured block copolymer (3), 12 parts by weight of ethyl acetate and 221 parts by weight of ethanol were added, and the mixture was warmed to be dissolved under stirring. After that, the solution was cooled under stirring to obtain the alcoholic resin dispersion (3).

Example 4

In 250 parts by weight of toluene, 100 parts by weight of the polymer block (A1) was dissolved. To the solution, 40 parts by weight of methyl acrylate, 60 parts by weight of stearyl acrylate, and 30 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (4)"). The weight-average molecular weight of the obtained block copolymer (4) was 31,000.

To 100 parts by weight of the manufactured block copolymer (4), 23 parts by weight of ethyl acetate and 210 parts by weight of ethanol were added, and the mixture was warmed to be dissolved under stirring. After that, the solution was cooled under stirring to obtain the alcoholic resin dispersion (4).

Example 5

In 250 parts by weight of toluene, 100 parts by weight of the polymer block (A1) was dissolved. To the solution, 20 parts by weight of n-butyl acrylate, 80 parts by weight of adamantyl acrylate, and 40 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (5)"). The weight-average molecular weight of the obtained block copolymer (5) was 32,000.

To 100 parts by weight of the manufactured block copolymer (5), 23 parts by weight of ethyl acetate and 210 parts by weight of ethanol were added, and the mixture was warmed to be dissolved under stirring. After that, the solution was cooled under stirring to obtain the alcoholic resin dispersion (5).

Example 6

In 250 parts by weight of toluene, 100 parts by weight of the polymer block (A1) was dissolved. To the solution, 80 parts by weight of ethyl acrylate and 20 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (6)"). The weight-average molecular weight of the obtained block copolymer (6) was 31,000.

To 100 parts by weight of the manufactured block copolymer (6), 210 parts by weight of isopropyl alcohol was added, and the mixture was warmed to be dissolved under stirring. To the solution, 23 parts by weight of water was added, and the solution was cooled under stirring to obtain the alcoholic resin dispersion (6).

Example 7

In 250 parts by weight of toluene, 100 parts by weight of the polymer block (A2) was dissolved. To the solution, 100 parts by weight of tert-butyl acrylate and 20 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (7)"). The weight-average molecular weight of the obtained block copolymer (7) was 92,000.

To 100 parts by weight of the manufactured block copolymer (7), 23 parts by weight of ethyl acetate and 210 parts by weight of ethanol were added, and the mixture was warmed to be dissolved under stirring. After that, the solution was cooled under stirring to obtain the alcoholic resin dispersion (7).

Example 8

In 250 parts by weight of toluene, 100 parts by weight of the polymer block (A1) was dissolved. To the solution, 20 parts by weight of methyl acrylate, 80 parts by weight of cyclohexyl acrylate, and 2 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (8)"). The weight-average molecular weight of the obtained block copolymer (8) was 28,000.

To 100 parts by weight of the manufactured block copolymer (8), 210 parts by weight of isopropyl alcohol was added, and the mixture was warmed to be dissolved under stirring. To the solution, 23 parts by weight of water was added, and the solution was cooled under stirring to obtain the alcoholic resin dispersion (8).

Example 9

In 250 parts by weight of toluene, 100 parts by weight of the polymer block (A1) was dissolved. To the solution, 20 parts by weight of methyl acrylate, 80 parts by weight of cyclohexyl acrylate, and 5 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (9)"). The weight-average molecular weight of the obtained block copolymer (9) was 29,000.

To 100 parts by weight of the manufactured block copolymer (9), 210 parts by weight of isopropyl alcohol was added, and the mixture was warmed to be dissolved under stirring. To the solution, 23 parts by weight of water was added, and the solution was cooled under stirring to obtain the alcoholic resin dispersion (9).

Example 10

In 250 parts by weight of toluene, 100 parts by weight of the polymer block (A1) was dissolved. To the solution, 20 parts by weight of methyl acrylate, 80 parts by weight of cyclohexyl acrylate, and 48 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (10)"). The weight-average molecular weight of the obtained block copolymer (10) was 36,000.

To 100 parts by weight of the manufactured block copolymer (10), 210 parts by weight of isopropyl alcohol was added, and the mixture was warmed to be dissolved under stirring. To the solution, 23 parts by weight of water was added, and the solution was cooled under stirring to obtain the alcoholic resin dispersion (10).

Example 11

In 250 parts by weight of toluene, 100 parts by weight of the polymer block (A1) was dissolved. To the solution, 71.8 parts by weight of ethyl acrylate, 107.7 parts by weight of isobornyl acrylate, and 53.8 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (11)"). The weight-average molecular weight of the obtained block copolymer (11) was 46,000.

To 100 parts by weight of the manufactured block copolymer (11), 210 parts by weight of isopropyl alcohol was added, and the mixture was warmed to be dissolved under stirring. To the solution, 23 parts by weight of water was added, and the solution was cooled under stirring to obtain the alcoholic resin dispersion (11).

Example 12

In 250 parts by weight of toluene, 100 parts by weight of the polymer block (A1) was dissolved. To the solution, 13.2 parts by weight of ethyl acrylate, 19.8 parts by weight of isobornyl acrylate, and 9.9 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (12)"). The weight-average molecular weight of the obtained block copolymer (12) was 36,000.

To 100 parts by weight of the manufactured block copolymer (12), 210 parts by weight of isopropyl alcohol was added, and the mixture was warmed to be dissolved under stirring. To the solution, 23 parts by weight of water was added, and the solution was cooled under stirring to obtain the alcoholic resin dispersion (12).

Example 13

In 250 parts by weight of toluene, 100 parts by weight of the polymer block (A1) was dissolved. To the solution, 50 parts by weight of ethyl acrylate, 30 parts by weight of isobornyl acrylate, and 20 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (13)"). The weight-average molecular weight of the obtained block copolymer (13) was 40,000.

To 100 parts by weight of the manufactured block copolymer (13), 210 parts by weight of isopropyl alcohol was added, and the mixture was warmed to be dissolved under stirring. To the solution, 23 parts by weight of water was added, and the solution was cooled under stirring to obtain the alcoholic resin dispersion (13).

Example 14

In 250 parts by weight of toluene, 100 parts by weight of the polymer block (A1) was dissolved. To the solution, 10 parts by weight of ethyl acrylate, 100 parts by weight of isobornyl acrylate, and 20 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (14)"). The weight-average molecular weight of the obtained block copolymer (14) was 38,000.

To 100 parts by weight of the manufactured block copolymer (14), 210 parts by weight of isopropyl alcohol was added, and the mixture was warmed to be dissolved under stirring. To the solution, 23 parts by weight of water was added, and the solution was cooled under stirring to obtain the alcoholic resin dispersion (14).

Example 15

In 250 parts by weight of toluene, 100 parts by weight of the polymer block (A3) was dissolved. To the solution, 20 parts by weight of ethyl acrylate, 20 parts by weight of t-butyl acrylate, and 5 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (15)"). The weight-average molecular weight of the obtained block copolymer (15) was 2,000.

To 100 parts by weight of the manufactured block copolymer (15), 210 parts by weight of isopropyl alcohol was added, and the mixture was warmed to be dissolved under stirring. To the solution, 23 parts by weight of water was added, and the solution was cooled under stirring to obtain the alcoholic resin dispersion (15).

Example 16

In 250 parts by weight of toluene, 100 parts by weight of the polymer block (A1) was dissolved. To the solution, 100 parts by weight of ethyl acrylate, 200 parts by weight of t-butyl acrylate, and 80 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (16)"). The weight-average molecular weight of the obtained block copolymer (16) was 50,000.

To 100 parts by weight of the manufactured block copolymer (16), 210 parts by weight of isopropyl alcohol was added, and the mixture was warmed to be dissolved under stirring. To the solution, 23 parts by weight of water was added, and the solution was cooled under stirring to obtain the alcoholic resin dispersion (16).

Example 17

In 250 parts by weight of toluene, 100 parts by weight of the polymer block (A1) was dissolved. To the solution, 20 parts by weight of methyl acrylate, 80 parts by weight of cyclohexyl acrylate, and 10 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (17)"). The weight-average molecular weight of the obtained block copolymer (17) was 30,000.

To 100 parts by weight of the manufactured block copolymer (17), 139.8 parts by weight of ethyl acetate and 93.2 parts by weight of methanol were added, and the mixture was warmed to be dissolved under stirring. After that, the solution was cooled under stirring to obtain the alcoholic resin dispersion (17).

Example 18

In 250 parts by weight of toluene, 100 parts by weight of the polymer block (A1) was dissolved. To the solution, 20 parts by weight of methyl acrylate, 80 parts by weight of cyclohexyl acrylate, and 10 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (18)"). The weight-average molecular weight of the obtained block copolymer (18) was 30,000.

To 100 parts by weight of the manufactured block copolymer (18), 117 parts by weight of ethyl acetate and 117 parts by weight of methanol were added, and the mixture was warmed to be dissolved under stirring. After that, the solution was cooled under stirring to obtain the alcoholic resin dispersion (18).

Comparative Example 1

In 250 parts by weight of toluene, 100 parts by weight of the polymer block (A1) was dissolved. To the solution, 20 parts by weight of methyl acrylate, 80 parts by weight of tert-butyl acrylate, and 80 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (19)"). The weight-average molecular weight of the obtained block copolymer (19) was 38,000.

To 100 parts by weight of the manufactured block copolymer (19), 23 parts by weight of ethyl acetate and 210 parts by weight of ethanol were added, and the mixture was warmed to be dissolved under stirring. After that, the solution was cooled under stirring to obtain the alcoholic resin dispersion (19).

Comparative Example 2

In 250 parts by weight of toluene, 100 parts by weight of the polymer block (A1) was dissolved. To the solution, 20 parts by weight of ethyl acrylate and 80 parts by weight of tert-butyl acrylate were added. To the mixture, 2,2'-azobis (2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (20)"). The weight-average molecular weight of the obtained block copolymer (20) was 29,000.

To 100 parts by weight of the manufactured block copolymer (20), 23 parts by weight of ethyl acetate and 210 parts by weight of ethanol were added, and the mixture was warmed to be dissolved under stirring. After that, the solution was cooled under stirring. The liquid after cooling was caked, and an alcoholic dispersion was not obtained.

<Fluidity Evaluation Test of Alcoholic Dispersion>

To a 30 ml-volume glass vessel, about 10 g of each alcoholic dispersion was added, and left overnight at room temperature. The vessel was manually shaken lightly, and fluidity of the alcohol dispersion was visually evaluated. The evaluation criteria were: "good" if the alcohol dispersion in the glass vessel flowed following the manual shake; "high viscosity" if flow of the alcohol dispersion following the manual shake was largely retarded; and "caking" if the alcohol dispersion did not move following the manual shake.

<Ink Adherence Test>

Forty grams of each of the obtained alcoholic resin dispersions (1) to (8), 120 g of the commercially available urethane resin for printing inks (manufactured by Hitachi Chemical Co., Ltd., the solid content was 30 wt %), and 160 g of titanium dioxide (manufactured by ISHIHARA SANGYO KAISHA, LTD., a rutile type) were diluted with 120 g of a mixture of ethyl acetate/isopropyl alcohol (the ratio by weight was 67/33). After the mixture was kneaded in a sand mill for 1 hour, an ink having viscosity of 25 to 30 seconds/20° C. was prepared by using a Zahn Cup #3.

Subsequently, the ink was applied onto the corona treated surface of an OPP film (Futamura Chemical Co., Ltd., 80 μm) by using a Coating Rod #5, and then the surface was dried with a dryer. After that, the cellophane tape (manufactured by Nichiban Co., Ltd., 24 mm) was attached on the ink-applied surface, and the condition of the surface after peeling of the tape was checked. The test was performed three times. When the evaluation results were different from each other, a range of the evaluations are shown.

Evaluation Criteria

Good for uses if the result is C or above.
A: No peeling-off of the coating.
B: 90% or more of the coating remains.
C: 50% or more, but less than 90% of the coating remains.
D: 50% or more of the coating is peeled off.

In Table 1, a composition of the polymer block (B) is listed for each of the Examples. In Table 2, a weight-average molecular weight and a hydroxy value of the block copolymer; a glass transition temperature of the polymer block (B); and an evaluation result of the alcoholic dispersing element are listed for each of the Examples. In Table 3, a percentage of the polymer block (B) in the block copolymer; a concentration of the block copolymer in the dispersion; an alcohol concentration in the solvent; and a type of the polymer block (A) are listed.

TABLE 1

| | MA | EA | nBA | tBA | CHA | SA | IBOA | ADA | HEA |
|---|---|---|---|---|---|---|---|---|---|
| Example 1 | 20 | | | | 80 | | | | 10 |
| Example 2 | | 40 | | | | | 60 | | 30 |
| Example 3 | | 20 | | 80 | | | | | 20 |
| Example 4 | 40 | | | | | 60 | | | 30 |
| Example 5 | | | 20 | | | | | 80 | 40 |
| Example 6 | | 80 | | | | | | | 20 |
| Example 7 | | | | 100 | | | | | 20 |
| Example 8 | 20 | | | | 80 | | | | 2 |
| Example 9 | 20 | | | | 80 | | | | 5 |
| Example 10 | 20 | | | | 80 | | | | 48 |
| Example 11 | | 71.8 | | | | | 107.7 | | 53.8 |
| Example 12 | | 13.2 | | | | | 19.8 | | 9.9 |
| Example 13 | | 50 | | | | | 30 | | 20 |
| Example 14 | | 10 | | | | | 100 | | 20 |
| Example 15 | | 20 | 20 | | | | | | 5 |
| Example 16 | | 100 | 200 | | | | | | 80 |
| Example 17 | 20 | | | | 80 | | | | 10 |
| Example 18 | 20 | | | | 80 | | | | 10 |
| Comparative Example 1 | 20 | | | 80 | | | | | 80 |
| Comparative Example 2 | | 20 | | 80 | | | | | |

[Footnote of Table 1]
MA: methyl acrylate
EA: ethyl acrylate
nBA: n-butyl acrylate
tBA: tert-butyl acrylate
SA: stearyl acrylate
CHA: cyclohexyl acrylate
IBOA: isobornyl acrylate
ADA: adamantyl acrylate
HEA: 2-hydroxyethyl acrylate

TABLE 2

| | a | b | c | d | e |
|---|---|---|---|---|---|
| Example 1 | 30000 | 14 | 22 | good | B |
| Example 2 | 32000 | 22 | 60 | good | A to B |
| Example 3 | 30000 | 19 | 42 | good | B |
| Example 4 | 31000 | 12 | 60 | good | B |

TABLE 2-continued

|  | a | b | c | d | e |
|---|---|---|---|---|---|
| Example 5 | 32000 | 49 | 77 | good | B |
| Example 6 | 31000 | −22 | 46 | good | C |
| Example 7 | 92000 | 32 | 42 | high viscosity | C |
| Example 8 | 28000 | 16 | 5 | high viscosity | C |
| Example 9 | 29000 | 15 | 11 | high viscosity | B |
| Example 10 | 36000 | 6 | 90 | good | C |
| Example 11 | 46000 | 22 | 76 | good | C |
| Example 12 | 36000 | 22 | 31 | high viscosity | A to B |
| Example 13 | 40000 | 5 | 46 | good | C |
| Example 14 | 38000 | 60 | 40 | good | B |
| Example 15 | 2000 | 3 | 15 | good | C |
| Example 16 | 50000 | 10 | 79 | good | B |
| Example 17 | 30000 | 14 | 22 | high viscosity | B |
| Example 18 | 30000 | 14 | 22 | good | B |
| Comparative Example 1 | 38000 | 11 | 133 | high viscosity | D |
| Comparative Example 2 | 29000 | 27 | 0 | caking | — | a: Weight-Average Molecular Weight of Block Copolymer [MW]
b: Glass Transition Temperature of (B) [Tg (° C.)]
c: Hydroxy Value of Block Copolymer [mg KOH/g]
d: Fluidity of Alcoholic Dispersion
e: Ink Adherence Test Result (Cellophane Tape Peeling)

TABLE 3

|  | Polymer Block (A)/Block Copolymer | Concentration of Block Copolymer in Dispersion (%) | Weight of Alcohol in Solvent (%) | Polymer Block A |
|---|---|---|---|---|
| Example 1 | 47.6 | 30 | 90 | A1 |
| Example 2 | 43.5 | 46 | 100 | A1 |
| Example 3 | 45.5 | 30 | 95 | A1 |
| Example 4 | 43.5 | 30 | 90 | A1 |
| Example 5 | 41.7 | 30 | 90 | A1 |
| Example 6 | 50 | 30 | 90 | A1 |
| Example 7 | 45.5 | 30 | 90 | A2 |
| Example 8 | 49.5 | 30 | 90 | A1 |
| Example 9 | 48.8 | 30 | 90 | A1 |
| Example 10 | 40.3 | 30 | 90 | A1 |
| Example 11 | 30 | 30 | 90 | A1 |
| Example 12 | 69.9 | 30 | 90 | A1 |
| Example 13 | 50 | 30 | 90 | A1 |
| Example 14 | 43.5 | 30 | 90 | A1 |
| Example 15 | 69 | 30 | 90 | A3 |
| Example 16 | 20.8 | 30 | 90 | A1 |
| Example 17 | 47.6 | 30 | 40 | A1 |
| Example 18 | 47.6 | 30 | 50 | A1 |
| Comparative Example 1 | 35.7 | 30 | 90 | A1 |
| Comparative Example 2 | 50 | 30 | 90 | A1 |

<Method for Measuring Physical Property of Resin>

1) Weight-Average Molecular Weight (Mw)

Mw was measured by GPC manufactured by TOSOH CORPORATION (Standard: polystyrene resin).

2) Glass Transition Temperature, Tg ('C)

Glass transition temperature (Tg) was calculated according to a weight proportion of each of the vinyl monomers by using the value of Tg of a homopolymer of each of the vinyl monomers described in Polymer Handbook and product data and using the FOX equation.

$$1/Tg = W_1/Tg_1 + W_2/Tg_2 + W_3/Tg_3 \qquad \text{<FOX Equation>}$$

(In the above-mentioned FOX Equation, the glass transition temperature of the homopolymer of each of the three monomers included in the polymer block is $Tg_1$ to $Tg_3$, respectively, and the weight fraction of each of the monomers is $W_1$ to $W_3$, respectively.)

3) Hydroxy Value, mg KOH/g

Hydroxy value was calculated according to a weight proportion of each of the vinyl monomers and a polymerization degree.

<Manufacture of Polymer Block (A4): Manufacture of α-Olefin Polymer Having Mercapto Group on its End>

(1) An α-olefin polymer (a propylene copolymer containing a 92 mol % propylene component and an 8 mol % ethylene component) was manufactured by using a metallocene catalyst (the weight-average molecular weight was 200,000, Tm=75° C.). The α-olefin polymer was fed to a twin screw extruder, and was melt-kneaded at 420° C. to be thermally decomposed, so that each α-olefin polymer having double bonds on its ends (the weight-average molecular weight was 23,000) was manufactured.

(2) In a reactor, 100 parts by weight of the α-olefin polymer having double bonds on its ends obtained in (1), 300 parts by weight of xylene, and 10 parts by weight of thioacetic acid were placed, and the inside of the reactor was purged with nitrogen sufficiently. To the reactor, 0.2 part by weight of 2,2'-azobisisobutyronitrile was added, and the mixture was reacted at 90° C. for 2 hours. The reactant was allowed to be precipitated in methanol, and unreacted thioacetic acid was removed to manufacture an α-olefin polymer having thioacetyl groups on its ends.

(3) In a mixed solvent of 200 parts by weight of xylene and 20 parts by weight of n-butanol, 100 parts by weight of the polymer block (A3) having thioacetyl groups on its ends obtained in (2) was dissolved. To the solution, 10 parts by weight of a 4% n-butanol solution of potassium hydroxide was added, and the mixture was reacted in nitrogen gas at 110° C. for 1 hour. After that, 0.6 part by weight of acetic acid was added thereto to manufacture an α-olefin polymer having mercapto groups on its ends (polymer block (A4)).

<Manufacture of Polymer Block (A4): Manufacture of α-Olefin Polymer Having Mercapto Group on its End>

(1) An α-olefin polymer (a propylene copolymer containing a 92 mol % propylene component and an 8 mol % ethylene component) was manufactured by using a metallocene catalyst (the weight-average molecular weight was 200,000, Tm=75° C.). The α-olefin polymer was fed to a twin screw extruder, and was melt-kneaded at 300° C. to be thermally decomposed, so that each α-olefin polymer having double bonds on its ends (the weight-average molecular weight was 70,000) was manufactured.

(2) In a reactor, 100 parts by weight of the α-olefin polymer having double bonds on its ends obtained in (1), 300 parts by weight of xylene, and 10 parts by weight of thioacetic acid were placed, and the inside of the reactor was purged with nitrogen sufficiently. To the reactor, 0.2 part by weight of 2,2'-azobisisobutyronitrile was added, and the mixture was reacted at 90° C. for 2 hours to manufacture an α-olefin polymer having thioacetyl groups on its ends.

(3) In a mixed solvent of 200 parts by weight of xylene and 20 parts by weight of n-butanol, 100 parts by weight of the polymer block (A4) having thioacetyl groups on its ends obtained in (2) was dissolved. To the solution, 10 parts by weight of a 4% n-butanol solution of potassium hydroxide was added, and the mixture was reacted in nitrogen gas at 110° C. for 1 hour. After that, 0.6 part by weight of acetic acid was added thereto to manufacture an α-olefin polymer having mercapto groups on its ends (polymer block (A4)).

Example 19

In 250 parts by weight of toluene, 100 parts by weight of the polymer block (A4) was dissolved. To the solution, 20 parts by weight of methyl acrylate, 80 parts by weight of cyclohexyl acrylate, and 10 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (21)"). The weight-average molecular weight of the obtained block copolymer (21) was 33,000.

Ten grams of a solution in which the manufactured block copolymer (21) was dissolved in a mixed solution of methylcyclohexane/propyl acetate (the ratio by weight was 60/40) (the solid content was 30 wt %), 120 g of the commercially available resin for gravure printing (SANPRENE IB-422, manufactured by Sanyo Chemical Industries, Ltd., the solid content was 30 wt %), and 160 g of titanium dioxide (manufactured by ISHIHARA SANGYO KAISHA, LTD., a rutile type) were diluted with 120 g of a mixture of methyl ethyl ketone/isopropyl alcohol (the ratio by weight was 67/33). After the mixture was kneaded in a sand mill for 1 hour, an ink having viscosity of 25 to 30 seconds/20° C. was prepared by using a Zahn Cup #3.

Example 20

In 250 parts by weight of toluene, 100 parts by weight of the polymer block (A4) was dissolved. To the solution, 20 parts by weight of ethyl acrylate, 80 parts by weight of stearyl acrylate, and 10 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (22)"). The weight-average molecular weight of the obtained block copolymer (22) was 33,000.

Ten grams of a solution in which the manufactured block copolymer (2) was dissolved in a mixed solution of methylcyclohexane/propyl acetate (the ratio by weight was 60/40) (the solid content was 30 wt %), 120 g of the commercially available resin for gravure printing (SANPRENE IB-422, manufactured by Sanyo Chemical Industries, Ltd., the solid content was 30 wt %), and 160 g of titanium dioxide (manufactured by ISHIHARA SANGYO KAISHA, LTD., a rutile type) were diluted with 120 g of a mixture of methyl ethyl ketone/isopropyl alcohol (the ratio by weight was 67/33). After the mixture was kneaded in a sand mill for 1 hour, an ink having viscosity of 25 to 30 seconds/20° C. was prepared by using a Zahn Cup #3.

Example 21

In 250 parts by weight of toluene, 100 parts by weight of the polymer block (A4) was dissolved. To the solution, 20 parts by weight of ethyl acrylate, 80 parts by weight of t-butyl acrylate, and 10 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (23)"). The weight-average molecular weight of the obtained block copolymer (23) was 30,000.

Ten grams of a solution in which the manufactured block copolymer (3) was dissolved in a mixed solution of methylcyclohexane/propyl acetate (the ratio by weight was 60/40) (the solid content was 30 wt %), 120 g of the commercially available resin for gravure printing (SANPRENE IB-422, manufactured by Sanyo Chemical Industries, Ltd., the solid content was 30 wt %), and 160 g of titanium dioxide (manufactured by ISHIHARA SANGYO KAISHA, LTD., a rutile type) were diluted with 120 g of a mixture of methyl ethyl ketone/isopropyl alcohol (the ratio by weight was 67/33). After the mixture was kneaded in a sand mill for 1 hour, an ink having viscosity of 25 to 30 seconds/20° C. was prepared by using a Zahn Cup #3.

Example 22

In 250 parts by weight of toluene, 100 parts by weight of the polymer block (A4) was dissolved. To the solution, 20 parts by weight of ethyl acrylate, 80 parts by weight of isobornyl acrylate, and 20 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (24)"). The weight-average molecular weight of the obtained block copolymer (24) was 32,000.

Ten grams of a solution in which the manufactured block copolymer was dissolved in a mixed solution of methylcyclohexane/propyl acetate (the ratio by weight was 60/40) (the solid content was 30 wt %), 120 g of the commercially available resin for gravure printing (SANPRENE IB-422, manufactured by Sanyo Chemical Industries, Ltd., the solid content was 30 wt %), and 160 g of titanium dioxide (manufactured by ISHIHARA SANGYO KAISHA, LTD., a rutile type) were diluted with 120 g of a mixture of methyl ethyl ketone/isopropyl alcohol (the ratio by weight was 67/33). After the mixture was kneaded in a sand mill for 1 hour, an ink having viscosity of 25 to 30 seconds/20° C. was prepared by using a Zahn Cup #3.

Example 23

In 250 parts by weight of toluene, 100 parts by weight of the polymer block (A4) was dissolved. To the solution, 40 parts by weight of ethyl acrylate, 60 parts by weight of adamantyl methacrylate, and 20 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (25)"). The weight-average molecular weight of the obtained block copolymer (25) was 32,000.

Ten grams of a solution in which the manufactured block copolymer was dissolved in a mixed solution of methylcyclohexane/propyl acetate (the ratio by weight was 60/40) (the solid content was 30 wt %), 120 g of the commercially available ink for gravure printing (SANPRENE IB-422, manufactured by Sanyo Chemical Industries, Ltd., the solid content was 30 wt %), and 160 g of titanium dioxide (manufactured by ISHIHARA SANGYO KAISHA, LTD., a rutile type) were diluted with 120 g of a mixture of methyl ethyl ketone/isopropyl alcohol (the ratio by weight was 67/33). After the mixture was kneaded in a sand mill for 1 hour, an ink having viscosity of 25 to 30 seconds/20° C. was prepared by using a Zahn Cup #3.

Example 24

In 250 parts by weight of toluene, 100 parts by weight of the polymer block (A4) was dissolved. To the solution, 40 parts by weight of ethyl acrylate, 60 parts by weight of cyclohexyl acrylate, and 10 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (26)"). The weight-average molecular weight of the obtained block copolymer (26) was 32,000.

Ten grams of a solution in which the manufactured block copolymer was dissolved in a mixed solution of methylcyclohexane/propyl acetate (the ratio by weight was 60/40) (the solid content was 30 wt %), 120 g of the commercially available resin for gravure printing (SANPRENE IB-422, manufactured by Sanyo Chemical Industries, Ltd., the solid content was 30 wt %), and 160 g of titanium dioxide (manufactured by ISHIHARA SANGYO KAISHA, LTD., a rutile type) were diluted with 120 g of a mixture of methyl ethyl ketone/isopropyl alcohol (the ratio by weight was 67/33). After the mixture was kneaded in a sand mill for 1 hour, an ink having viscosity of 25 to 30 seconds/20° C. was prepared by using a Zahn Cup #3.

Example 25

In 250 parts by weight of toluene, 100 parts by weight of the polymer block (A5) was dissolved. To the solution, 20 parts by weight of ethyl acrylate, 80 parts by weight of t-butyl acrylate, and 10 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer (A) and the acrylic acid ester block (B) (hereinafter, referred to as "block copolymer (27)"). The weight-average molecular weight of the obtained block copolymer (27) was 90,000.

Ten grams of a solution in which the manufactured block copolymer was dissolved in a mixed solution of methylcyclohexane/propyl acetate (the ratio by weight was 60/40) (the solid content was 30 wt %), 120 g of the commercially available resin for gravure printing (SANPRENE IB-422, manufactured by Sanyo Chemical Industries, Ltd., the solid content was 30 wt %), and 160 g of titanium dioxide (manufactured by ISHIHARA SANGYO KAISHA, LTD., a rutile type) were diluted with 120 g of a mixture of methyl ethyl ketone/isopropyl alcohol (the ratio by weight was 67/33). After the mixture was kneaded in a sand mill for 1 hour, an ink having viscosity of 25 to 30 seconds/20° C. was prepared by using a Zahn Cup #3.

Comparative Example 3

In 250 parts by weight of toluene, 100 parts by weight of the polymer block (A4) was dissolved. To the solution, 20 parts by weight of methyl acrylate and 80 parts by weight of cyclohexyl acrylate were added. To the mixture, 2,2'-azobis (2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (28)"). The weight-average molecular weight of the obtained block copolymer (28) was 30,000.

Ten grams of a solution in which the manufactured block copolymer (28) was dissolved in a mixed solution of methylcyclohexane/propyl acetate (the ratio by weight was 60/40) (the solid content was 30 wt %), 120 g of the commercially available resin for gravure printing (SANPRENE IB-422, manufactured by Sanyo Chemical Industries, Ltd., the solid content was 30 wt %), and 160 g of titanium dioxide (manufactured by ISHIHARA SANGYO KAISHA, LTD., a rutile type) were diluted with 120 g of a mixture of methyl ethyl ketone/isopropyl alcohol (the ratio by weight was 67/33). After the mixture was kneaded in a sand mill for 1 hour, an ink having viscosity of 25 to 30 seconds/20° C. was prepared by using a Zahn Cup #3.

Comparative Example 4

In 250 parts by weight of toluene, 100 parts by weight of the polymer block (A4) was dissolved. To the solution, 20 parts by weight of methyl acrylate, 80 parts by weight of t-butyl acrylate, and 80 parts by weight of 2-hydroxyethyl acrylate were added. To the mixture, 2,2'-azobis(2,4-dimethylvaleronitrile) was added at 90° C. in nitrogen gas so that the polymerization rate was about 15% per 1 hour, and the reaction was stopped when the polymerization degree became 90%. The reaction liquid was cooled, and the solvent was removed to obtain the AB-type diblock copolymer including the α-olefin polymer block (A) and the acrylic acid ester block (B) (hereinafter, referred to as "block copolymer (29)"). The weight-average molecular weight of the obtained block copolymer (29) was 38,000.

Ten grams of a solution in which the manufactured block copolymer was dissolved in a mixed solution of methylcyclohexane/propyl acetate (the ratio by weight was 60/40) (the solid content was 30 wt %), 120 g of the commercially available resin for gravure printing (SANPRENE IB-422, manufactured by Sanyo Chemical Industries, Ltd., the solid content was 30 wt %), and 160 g of titanium dioxide (manufactured by ISHIHARA SANGYO KAISHA, LTD., a rutile type) were diluted with 120 g of a mixture of methyl ethyl ketone/isopropyl alcohol (the ratio by weight was 67/33). After the mixture was kneaded in a sand mill for 1 hour, an ink having viscosity of 25 to 30 seconds/20° C. was prepared by using a Zahn Cup #3.

<Method for Measuring Physical Property of Resin>

The weight-average molecular weight, glass transition temperature, and hydroxy value were measured for each of the resins by the same methods as in Example 1.

<Ink Test>

For the obtained inks, evaluations of solution states after preparations and results of cellophane tape peel tests and peel strength tests are listed in Table 2.

1) Evaluation Test of Solution State

After the preparation, the ink was left to stand, and compatibility was visually evaluated. The evaluation criteria were: "good" if granules, high viscosity, and/or separation was/were not observed; and "no good" if granules, high viscosity, and/or separation was/were observed.

2) Cellophane Tape Peel Test

The ink was applied onto the corona treated surface of an OPP film (Futamura Chemical Co., Ltd., 80 µm), the corona treated surface of a polyester film (Unitika, 25 µm), and the corona treated surface of a nylon film (Unitika, 25 µm) by using a Coating Rod #5, and then the surfaces were dried with a dryer. After that, the cellophane tape (manufactured by Nichiban Co., Ltd., 24 mm) was attached on the ink-applied surface, and the condition of the surface after peeling of the tape was checked. The measurement was performed three times. When the evaluation results were different from each other, a range of the evaluations are shown.

Evaluation Criteria

Although it is good for uses if the result is C or above, B is preferable.

A: No peeling-off of the coating.
B: 90% or more of the coating remains.
C: 50% or more, but less than 90% of the coating remains.
D: 50% or more of the coating is peeled off.

3) Peel Strength Test

To a test piece obtained in the cellophane tape test, NWBB-20 manufactured by Nichiban Co., Ltd. was attached, and a cellophane tape was attached on the one side thereof.

Then T-peel strength (N/20 mm) was measured by Tensilon (the measurement rate was 100 mm/min).

Evaluation Criteria

Although it is good for uses if the result is C or above, B is preferable.

A: A value more desirable for uses.
B: A value within a range having no problems for uses.
C: A value within a range having no problems for uses, but a concern about peeling-off and the like exists.
D: A value within a range having problems for uses.

In Table 4, a composition of the monomers is listed for each of the Examples, and in Table 4, test results are listed for each of the Examples.

TABLE 4

| | | PB Composition of Monomer (Ratio by Weight) | | | | | | | |
|---|---|---|---|---|---|---|---|---|---|
| BC | PA | a | b | c | d | e | f | g | h |
| 21 | 4 | 20 | | 80 | | | | | 10 |
| 22 | 4 | | 20 | | 80 | | | | 10 |
| 23 | 4 | | 20 | | | 80 | | | 10 |
| 24 | 4 | | 20 | | | | 80 | | 20 |
| 25 | 4 | | 40 | | | | | 60 | 20 |
| 26 | 4 | | 40 | 60 | | | | | 10 |
| 27 | 5 | | 20 | | | 80 | | | 10 |
| 28 | 4 | 20 | | 80 | | | | | |
| 29 | 4 | 20 | | | | | 80 | | 80 |

BC: Block Copolymer
PA: Polymer A
PB: Polymer B
a: Methyl Acrylate
b: Ethyl Acrylate
c: Cyclohexyl Acrylate
d: Stearyl Acrylate
e: t-Butyl Acrylate
f: Isobornyl Acrylate
g: Adamantyl Methacrylate
h: 2-Hydroxyethyl Acrylate

TABLE 5

| | | | | | | f | | | |
|---|---|---|---|---|---|---|---|---|---|
| | a | b | c | d | e | OPP | PET | PA6 | g |
| Example 19 | 21 | 33000 | 14 | 22 | good | B | — | — | B |
| Example 20 | 22 | 33000 | 14 | 22 | good | B to A | — | — | B |
| Example 21 | 23 | 30000 | 23 | 22 | good | B to A | B to A | B to A | A |
| Example 22 | 24 | 32000 | 46 | 42 | good | B to A | B to A | B to A | A |
| Example 23 | 25 | 32000 | 44 | 42 | good | B to A | — | — | A |
| Example 24 | 26 | 32000 | -1 | 22 | good | D to B | — | — | C |
| Example 25 | 27 | 90000 | 23 | 22 | no good | C | — | — | C |
| Comparative Example 3 | 28 | 30000 | 17 | 0 | no good | D | D | D | D |
| Comparative Example 4 | 29 | 38000 | 11 | 133 | good | D to B | — | — | D | a: Block Copolymer (C)
b: Weight-Average Molecular Weight of (C) [MW]
c: Glass Transition Temperature of (B) [Tg (° C.)]
d: Hydroxy Value of (C) [mg KOH/g]
e: Ink Compatibility
f: Tape Peeling
g: Peel Strength

The invention claimed is:

1. A block copolymer consisting of:
a polymer block (A) consisting of (i) one or more olefin monomer units in a total amount of 50 mol % or more and the remainder being one or more units derived from a vinyl monomer that is copolymerizable with the olefin monomer, or (ii) consisting of one or more olefin monomer units, and
a polymer block (B) consisting of (i) a first vinyl monomer having one or more hydroxy groups and (ii) a second vinyl monomer copolymerizable with the first vinyl monomer,
wherein the block copolymer has a hydroxy value within a range of 5 mg KOH/g to 120 mg KOH/g, and
a glass transition temperature of the polymer block (B) is 10° C. or above.

2. The block copolymer according to claim 1, wherein an amount of the polymer block (A) contained in the block copolymer is within a range of 10% by weight to 90% by weight.

3. The block copolymer according to claim 1, wherein a glass transition temperature of the polymer block (B) is 200° C. or below.

4. The block copolymer according to claim 1, wherein the block copolymer has a weight-average molecular weight within a range of 1,000 to 100,000.

5. A block copolymer dispersion comprising the block copolymer according to claim 1 dispersed in a solvent comprising 50% by weight or more of an alcohol.

6. A resin composition comprising the block copolymer according to claim 1 and a urethane resin.

7. An ink composition, paint composition or adhesive composition comprising the block copolymer according to claim 1.

8. The composition according to claim 7, wherein the composition is an ink composition suitable for gravure printing or flexo printing.

9. A printed material obtained by a method for gravure printing or flexo printing comprising applying the composition according to claim 8 to a material.

10. A method for gravure printing or flexo printing, comprising applying the composition according to claim 8 to a material.

11. An ink composition, paint composition or adhesive composition comprising the dispersion according to claim 5.

12. The composition according to claim 11, wherein the composition is an ink composition suitable for gravure printing or flexo printing.

13. A printed material obtained by a method for gravure printing or flexo printing comprising applying the composition according to claim 12 to a material.

14. A method for gravure printing or flexo printing, comprising applying the composition according to claim 12 to a material.

15. An ink composition, paint composition or adhesive composition comprising the resin composition according to claim 6.

16. The composition according to claim 15, wherein the composition is an ink composition suitable for gravure printing or flexo printing.

17. A printed material obtained by a method for gravure printing or flexo printing comprising applying the composition according to claim 16 to a material.

18. A method for gravure printing or flexo printing, comprising applying the composition according to claim 16 to a material.

19. The block copolymer according to claim 1, wherein said unit derived from a vinyl monomer that is copolymerizable with the olefin monomer is a vinyl ester or a (meth) acrylic acid ester.

20. The block copolymer according to claim 1, wherein said unit derived from a vinyl monomer that is copolymerizable with the olefin monomer is selected from the group consisting of (meth)acrylonitrile, vinyl acetate, vinyl pivalate, methyl (meth)acrylate, ethyl (meth)acrylate, butyl (meth)acrylate, dodecyl (meth)acrylate, 2-ethylhexyl (meth) acrylate, (meth)acrylamide, and N-vinyl-2-pyrrolidone.

21. The block copolymer according to claim 1, wherein said unit derived from a vinyl monomer that is copolymerizable with the olefin monomer is selected from the group consisting of methyl acrylate, ethyl acrylate, and vinyl acetate.

22. The block copolymer of claim 1, wherein polymer block (A) is a polymer block consisting of one or more olefin monomer units.

23. The block copolymer of claim 1, wherein polymer block (A) is a polymer block consisting of one or more olefin monomer units in a total amount of 50 mol % or more with the remainder being one or more units derived from a vinyl monomer that is copolymerizable with the olefin monomer.

* * * * *

UNITED STATES PATENT AND TRADEMARK OFFICE
CERTIFICATE OF CORRECTION

PATENT NO. : 10,435,558 B2  Page 1 of 1
APPLICATION NO. : 15/506582
DATED : October 8, 2019
INVENTOR(S) : Minoru Yada et al.

It is certified that error appears in the above-identified patent and that said Letters Patent is hereby corrected as shown below:

On the Title Page

Item (72) the 5th inventor's city of residence is incorrect. Item (72) should read:
-- (72) Minoru Yada, Yamaguchi (JP); Yuu Takata, Yamaguchi (JP); Junichi Hayakawa, Yamaguchi (JP); Shunji Sekiguchi, Yamaguchi (JP); Kazutaka Nakagawa, Yamaguchi (JP) --

Signed and Sealed this
Twenty-first Day of April, 2020

Andrei Iancu
*Director of the United States Patent and Trademark Office*